(12) United States Patent
Lin et al.

(10) Patent No.: US 8,109,665 B2
(45) Date of Patent: Feb. 7, 2012

(54) BACKLIGHT MODULE

(75) Inventors: Tzu-Pin Lin, Tainan (TW); Tzung-Yang Li, Taipei County (TW); Chien-Lung Tsou, Taoyuan County (TW); Chi-Neng Mo, Taoyuan County (TW)

(73) Assignee: Chunghwa Picture Tubes, Ltd., Bade, Taoyuan (TW)

( * ) Notice: Subject to any disclaimer, the term of this patent is extended or adjusted under 35 U.S.C. 154(b) by 255 days.

(21) Appl. No.: 12/698,156

(22) Filed: Feb. 2, 2010

(65) Prior Publication Data

US 2011/0141764 A1   Jun. 16, 2011

(30) Foreign Application Priority Data

Dec. 14, 2009   (TW) .............................. 98223420 U

(51) Int. Cl.
*F21V 7/04* (2006.01)
(52) U.S. Cl. ....... 362/606; 362/97.1; 362/607; 362/618; 362/619

(58) Field of Classification Search ........ 362/97.1–97.4, 362/606, 607, 612, 614, 618, 619
See application file for complete search history.

(56) References Cited

U.S. PATENT DOCUMENTS

| | | | |
|---|---|---|---|
| 7,717,600 B2 * | 5/2010 | Lim et al. ...................... | 362/606 |
| 7,819,542 B2 * | 10/2010 | Sato .............................. | 362/97.1 |
| 2006/0291252 A1 * | 12/2006 | Lim et al. ..................... | 362/618 |
| 2010/0079977 A1 * | 4/2010 | Lee et al. ..................... | 362/97.1 |
| 2010/0079978 A1 * | 4/2010 | Nakamura ................... | 362/97.1 |

* cited by examiner

*Primary Examiner* — John A Ward
(74) *Attorney, Agent, or Firm* — Winston Hsu; Scott Margo

(57) ABSTRACT

A backlight module is provided. The backlight module has a reflective chamber and a light source. The reflective chamber includes a bottom reflector, a top reflector, at least a light entrance, and a plurality of light emitting openings disposed on the top reflector. The light source is disposed corresponding to the light entrance. The number of the light emitting openings per unit area in a region near the light source is less than the number of the light emitting openings per unit area in another region far from the light source.

16 Claims, 7 Drawing Sheets

BACKLIGHT MODULE

BACKGROUND OF THE INVENTION

1. Field of the Invention

The present invention relates to a backlight module, and more particularly to a backlight module without a light guide plate.

2. Description of the Prior Art

With advantages of low radiation, low power consumption, light in weight, and thin in thickness, liquid crystal display devices are widely applied in electronic apparatuses such as personal digital assistants (PDA), notebook computers, digital cameras, and mobile phones. Since liquid crystal display panels are not self-emission, the liquid crystal display devices require backlight modules disposed below the liquid crystal display panels to provide surface light sources for displaying.

Refer to FIG. 1, FIG. 1 is a schematic diagram illustrating a backlight module 10 of the liquid crystal display device in the prior art. The backlight module 10 includes a frame 12, a reflection plate 14, a plurality of the light tube 16, a light guide plate 18, and a plurality of transparent optical thin films 20. A portion of light beam emitted from the light tube 16 directly enter the light guide plate 18, the remaining light beams are reflected on the surface of the reflection plate 14 and then enter the light guide plate 18. In addition, a plurality of transparent optical thin films 20 are disposed on an exiting plane of the light guide plate 18, so that the backlight module 10 can output more uniform light beams to provide the liquid crystal display device (not shown in the figure) with the light source for displaying images.

However, the light guide plate 18 in the backlight module 10 is usually made of plastic, and the light guide plate 18 has a definite weight. This is contrary to the development of the liquid crystal display device toward the weight reduction. As a result, how to reduce the weight of the backlight module for further decreasing the weight of the liquid crystal display device is a major issue required to be improved.

SUMMARY OF THE INVENTION

It is therefore one of the objectives of the present invention to provide a backlight module to solve the problem in the prior art.

According to a preferred embodiment of the present invention, a backlight module is provided. The backlight module includes a reflective chamber and at least a light source. The reflective chamber includes a bottom reflector, a top reflector disposed opposite to the bottom reflector, at least a light entrance, and a plurality of light emitting openings disposed on the top reflector. The light source is corresponding to the light entrance. Furthermore, the top reflector has m number of regions, and a (n−1)th region is adjacent to a (n)th region, where m is a positive integer greater than or equal to 2, n is a positive integer, and $2 \leq n \leq m$. Also, the distance between the (n−1)th region and the light source is shorter than the distance between the (n)th region and the light source, and a number of the light emitting openings per unit area in the (n−1)th region is less than a number of the light emitting openings per unit area in the (n)th region.

According to another preferred embodiment of the present invention, a backlight module is provided. The backlight module includes a reflective chamber and at least a light source. The reflective chamber includes a bottom reflector, a top reflector disposed opposite to the bottom reflector, at least a light entrance, and a plurality of light emitting openings disposed on the top reflector. The light source is corresponding to the light entrance. Furthermore, the top reflector has m number of regions, and a (n−1)th region is adjacent to a (n)th region, where m is a positive integer greater than or equal to 2, n is a positive integer, and $2 \leq n \leq m$. Also, the distance between the (n−1)th region and the light source is shorter than the distance between the (n)th region and the light source, and a size of each of the light emitting openings in the (n−1)th region is less than a size of each of the light emitting openings in the (n)th region.

As mentioned above, light beams emitted from the light source can be transmitted by reflection in the reflective chamber of the present invention, and the light beams can be emitted out of the backlight module through a plurality of light emitting openings. Therefore, the backlight module of the present invention may not require use of light guide plate, and the weight reduction of the backlight module can be achieved.

These and other objectives of the present invention will no doubt become obvious to those of ordinary skill in the art after reading the following detailed description of the preferred embodiment that is illustrated in the various figures and drawings.

DETAILED DESCRIPTION

In the following specifications and claims, certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to".

Figure 1:
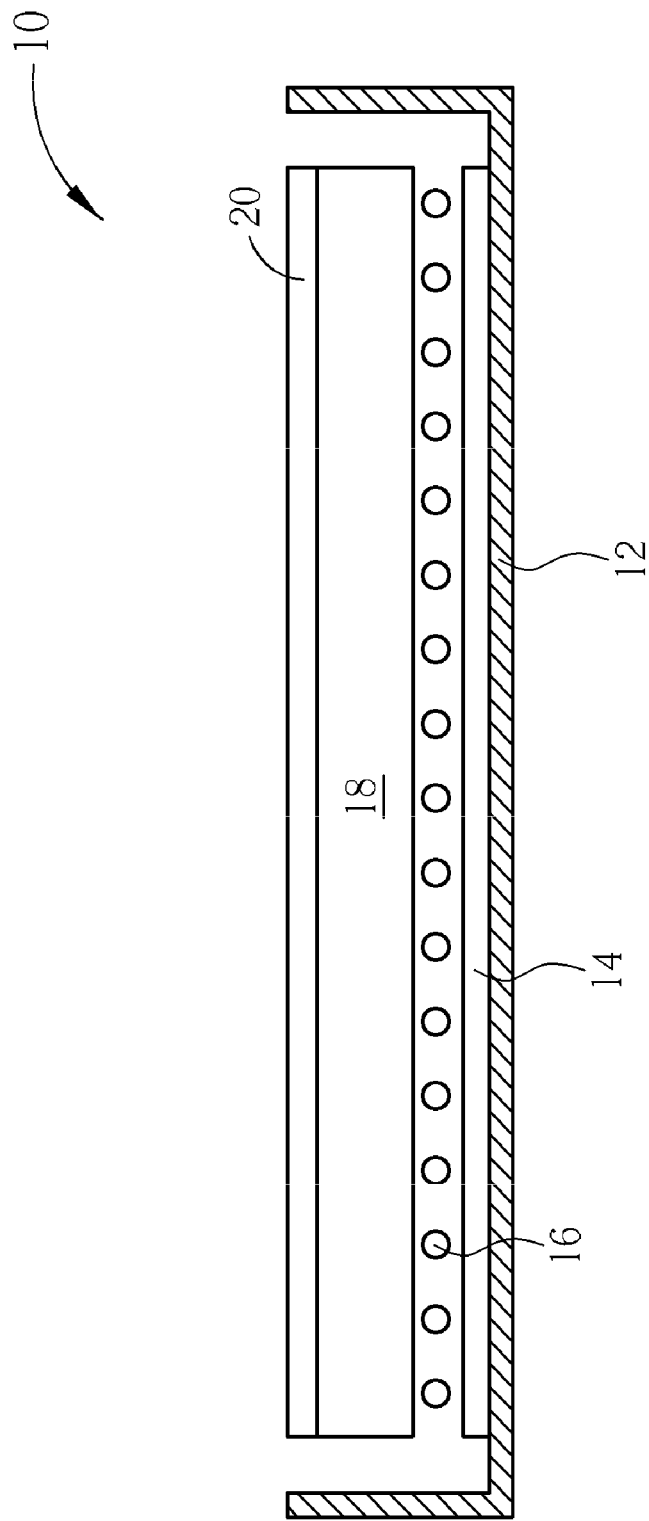
FIG. 1 is a schematic diagram illustrating a backlight module of the liquid crystal display device in the prior art.
Figure 2:
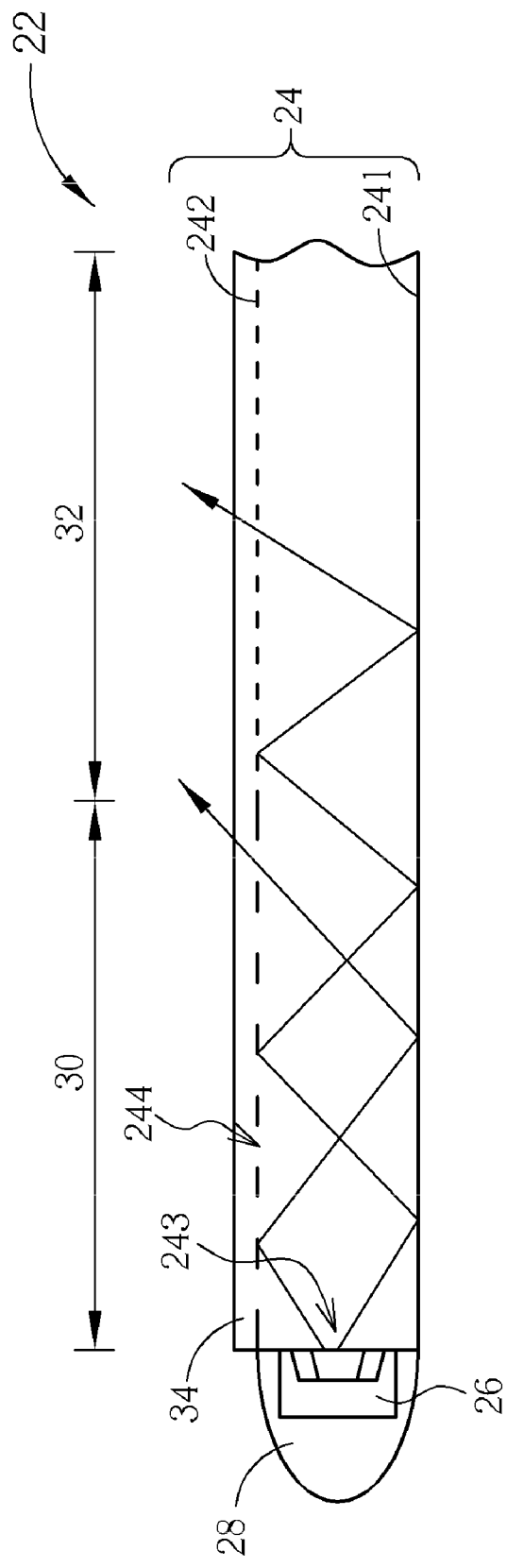
FIG. 2 and FIG. 3 are schematic diagrams illustrating a backlight module according to a preferred embodiment of the present invention.
Figure 3:
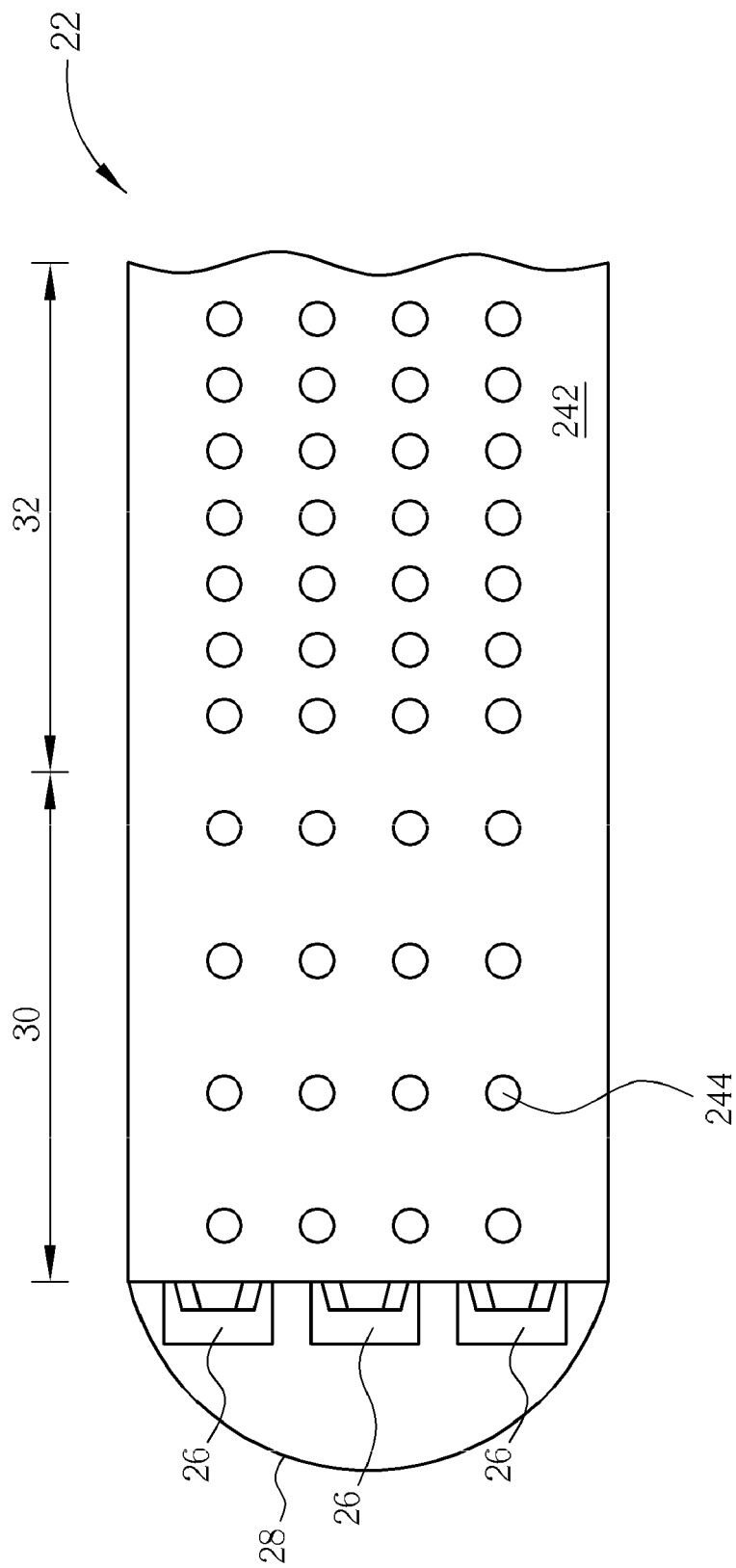

Refer to FIG. 2 and FIG. 3. FIG. 2 and FIG. 3 are schematic diagrams illustrating a backlight module 22 according to a preferred embodiment of the present invention, wherein FIG. 2 is a side view of the backlight module 22, and FIG. 3 is a top view of the backlight module 22. As shown in FIG. 2 and FIG. 3, the backlight module 22 includes a reflective chamber 24 and at least a light source 26. The reflective chamber 24 includes a bottom reflector 241, a top reflector 242, a light entrance 243, and a plurality of light emitting openings 244 disposed on the top reflector 242, wherein the bottom reflector 241 is relatively disposed below the top reflector 242, and a microstructure can be selectively disposed on the surface of the bottom reflector 241 to increase the effect of reflection and scattering in the reflective chamber 24. The backlight module 22 of the present embodiment can be an edge-type backlight module, and the light source 26 can be a light emitting diode (LED) or a cold cathode fluorescent lamp (CCFL). Also, the light source 26 can be disposed corresponding to the light entrance 243. In addition, the backlight module 22 can further dispose a reflector 28 on a side of the light source 26 opposite to the light entrance 243, so that light beam emitted from the light source toward the reflector can be reflected on the surface of the reflector and can enter the reflective chamber 24 to improve the utilization rate of the light source 26.

Furthermore, the top reflector 242 can include m number of regions. An embodiment with m=2 is exemplified as follows, but not limited. As shown in FIG. 3, a size of each of the light emitting openings 244 on the top reflector 242 is identical. Also, the top reflector 242 can include a first region 30 and a second region 32, wherein the first region 30 is adjacent to the light source 26, and the first region 30 is disposed between the light source 26 and the second region 32. It should be noted that the distribution density of the light emitting openings 244 are different in different regions. A number of the light emitting openings 244 per unit area in the first region 30 is less than a number of the light emitting openings 244 per unit area in the second region 32. That is, the distribution density of the light emitting openings 244 in the first region 30 near the light source 26 is less than the distribution density of the light emitting openings 244 in the second region 32 far from the light source 26. Accordingly, the luminance difference between the first region 30 near the light source 26 and the second region 32 far from the light source 26 can be reduced. Refer to FIG. 2, light beams generated from the light source 26 enter the reflective chamber 24 through the light entrance 243. Then, the light beams are transmitted by repeated reflection in the reflective chamber 24 which is constructed by the top reflector 242 and the bottom reflector 241. Subsequently, the light beams can only emit out through the light emitting openings 244. In addition, since the distribution density of the light emitting openings 244 on the top reflector 241 is adjusted in the different regions, the light beams of the backlight module 22 can be emitted out uniformly. Furthermore, the backlight module 22 can include a diffusion plate 34 disposed on an exiting plane of the backlight module 22, and the top reflector 242 is attached to a surface of the diffusion plate 34 opposite to the bottom reflector 241. Accordingly, the light beams emitted from the light emitting openings 244 can become a more uniform surface light source through the diffusion plate 34.

Figure 4:
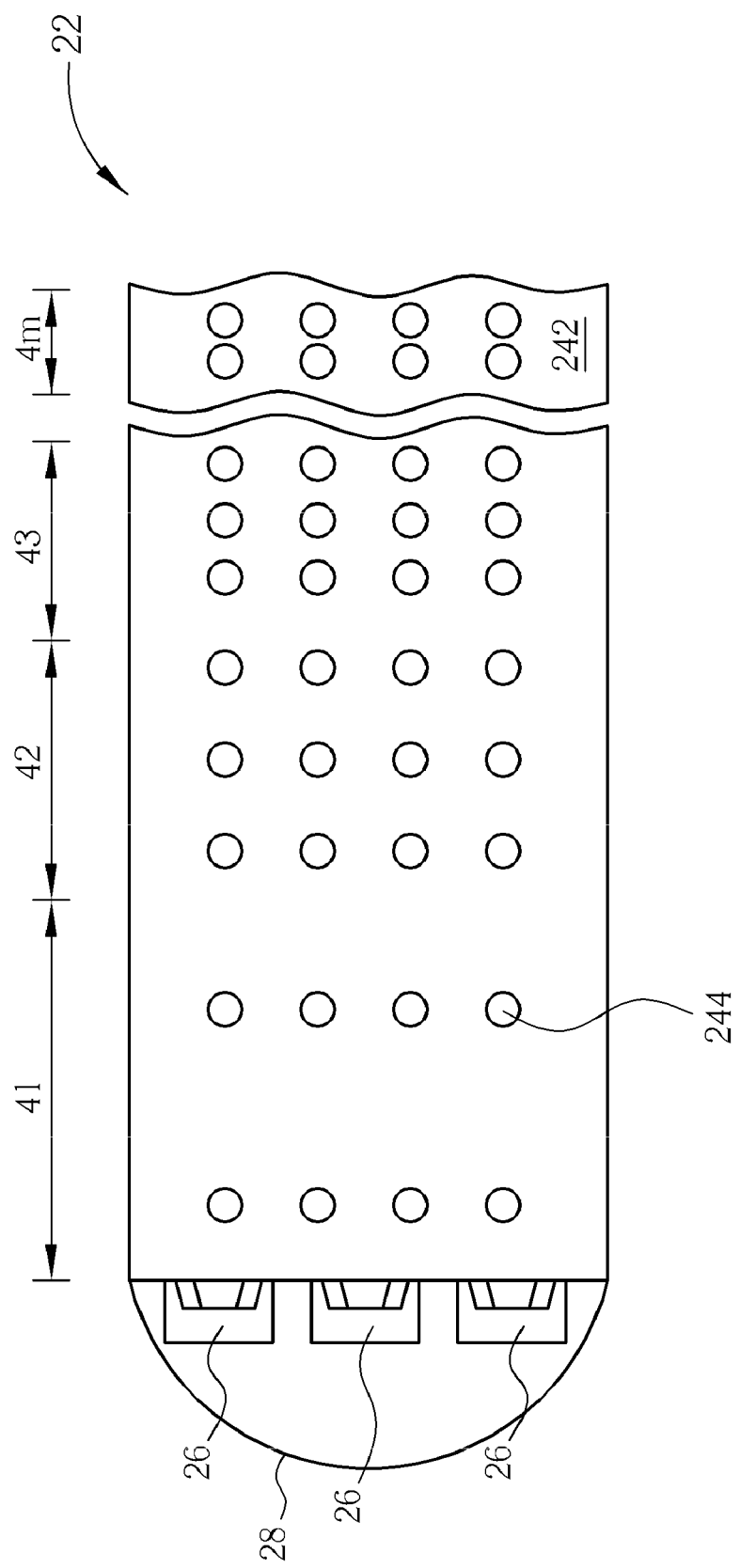
FIG. 4 is a schematic diagram illustrating another example of FIG. 3.

In addition, the top reflector 242 can be another type in the present embodiment. Refer to FIG. 4, FIG. 4 is a schematic diagram illustrating another example of FIG. 3. As shown in FIG. 4, the top reflector 242 can include m number of regions, such as a 1st region 41, a 2nd region 42, a 3rd region 43, . . . , (m)th region 4m. A (n−1)th region is adjacent to a (n)th region, where n is a positive integer, and 2≦n≦m. Also, the distance between the (n−1)th region and the light source 26 is shorter than the distance between the (n)th region and the light source 26, and a number of the light emitting openings 244 per unit area in the (n−1)th region is less than a number of the light emitting openings 244 per unit area in the (n)th region. Furthermore, the distance between adjacent light emitting openings 244 in the (n−1)th region can be greater than the distance between adjacent light emitting openings 244 in the (n)th region. For example, when n is equal to 2, the 1st region 41 is adjacent to the 2nd region 42, and the 1st region 41 is more close to the light source 26 than the 2nd region 42. Also, a number of the light emitting openings 244 per unit area in the 1st region 41 is less than a number of the light emitting openings 244 per unit area in the 2nd region 42. Moreover, the distance between adjacent light emitting openings 244 in the 1st region 41 is greater than the distance between adjacent light emitting openings 244 in the 2nd region 42. It should be noted that as the distance between a light emitting opening 244 and the light source 26 increases, the distance between the light emitting opening 244 and an adjacent light emitting opening 244 can decrease gradually, but not limited.

Figure 5:
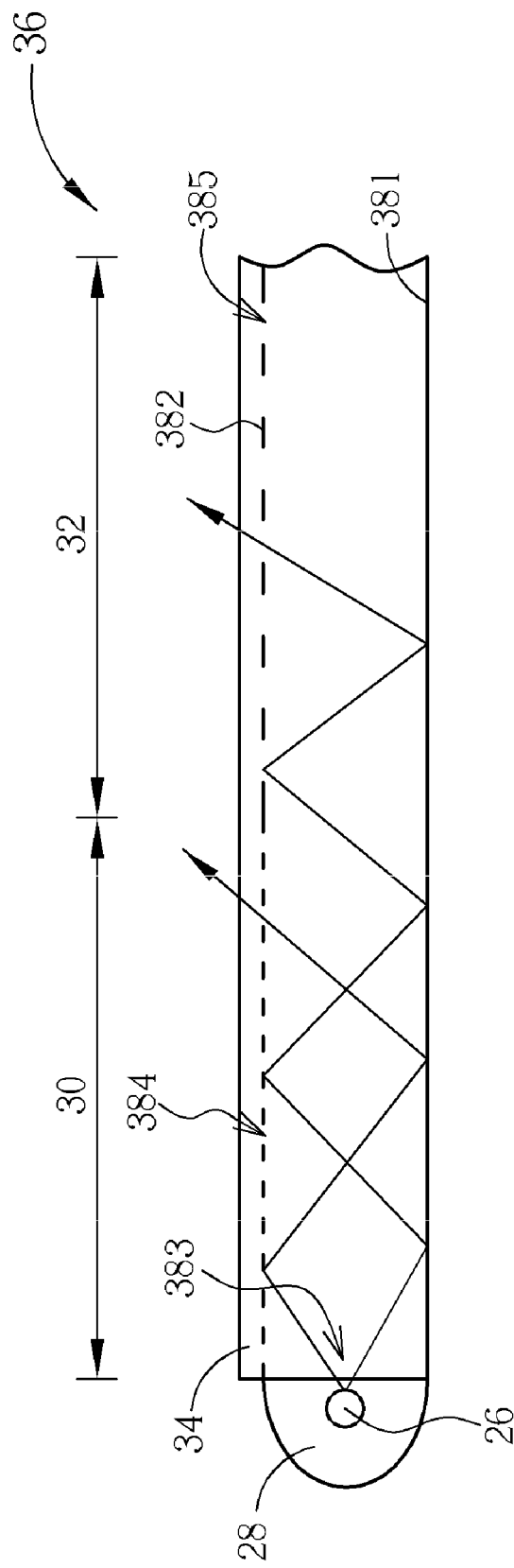
FIG. 5 and FIG. 6 are schematic diagrams illustrating a backlight module according to another preferred embodiment of the present invention.
Figure 6:
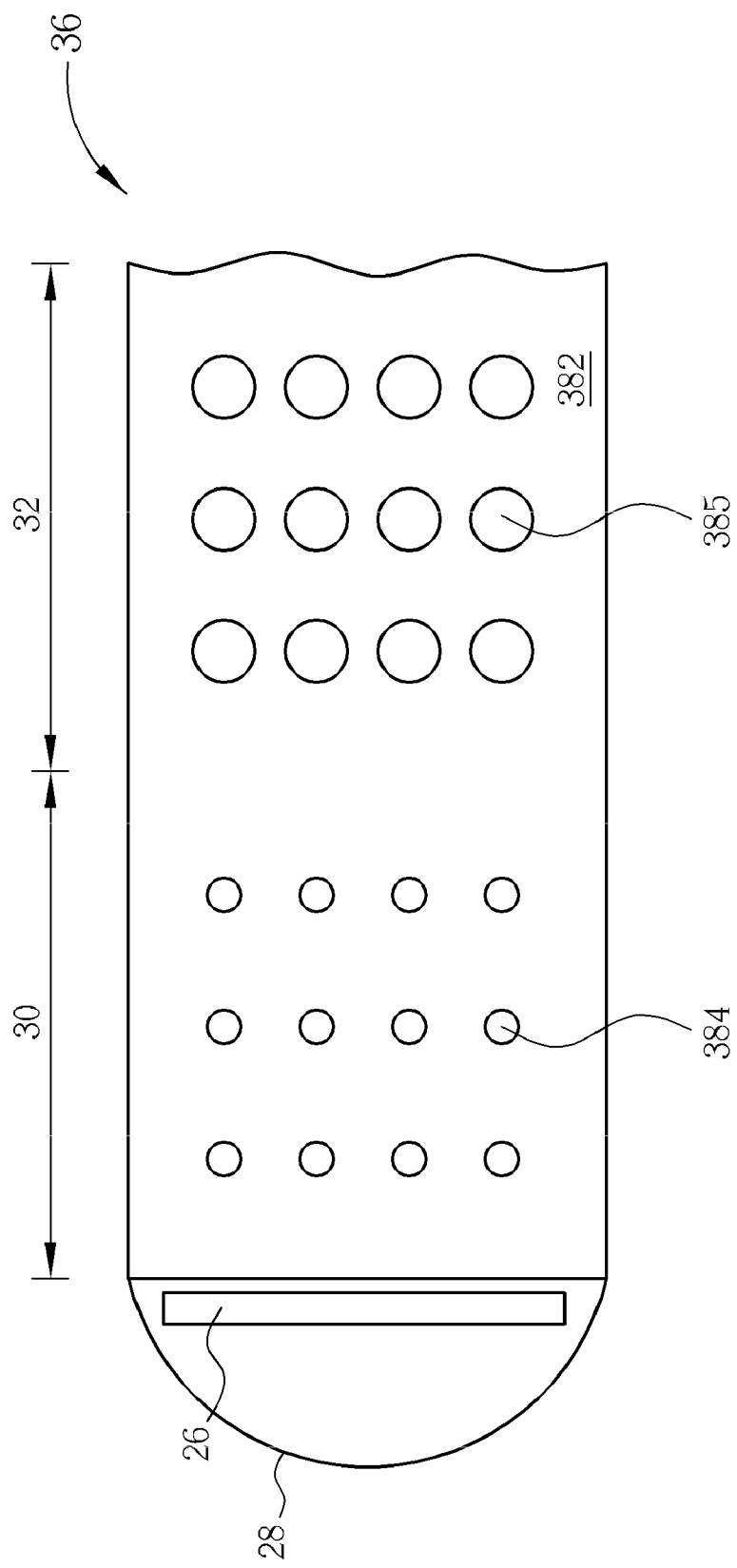

Subsequently, refer to FIG. 5 and FIG. 6. FIG. 5 and FIG. 6 are schematic diagrams illustrating a backlight module 36 according to another preferred embodiment of the present invention, wherein FIG. 5 is a side view of the backlight module 36, and FIG. 6 is a top view of the backlight module 36. To simplify the description and for the convenience of comparison between the present embodiments and the previous embodiments, identical elements are denoted by identical numerals. As shown in FIG. 5, the backlight module 36 includes a reflective chamber 38 and at least a light source 26. The reflective chamber 38 includes a bottom reflector 381, a top reflector 381, a light entrance 383, and a plurality of light emitting openings 384 and 385 disposed on the top reflector 382, wherein the bottom reflector 381 is relatively disposed below the top reflector 382, and a microstructure can be selectively disposed on the surface of the bottom reflector 381 to increase the effect of reflection and scattering in the reflective chamber 38. Similar to the previous embodiment, the backlight module 36 can be an edge-type backlight module, and the light source 26 can be a light emitting diode or a cold cathode fluorescent lamp. Also, the light source 26 can be disposed corresponding to the light entrance 383. In addition, the backlight module 22 can further dispose a reflector 28 on a side of the light source 26 opposite to the light entrance 383 to improve the utilization rate of the light source 26.

Furthermore, the top reflector 382 can include m number of regions. An embodiment with m=2 is exemplified as follows, but not limited. As shown in FIG. 6, the top reflector 382 can include a first region 30 and a second region 32. The distance between adjacent light emitting openings 384 in the first region 30 is equal to the distance between adjacent light emitting openings 385 in the second region 32. That is, the distribution density of the light emitting openings 384 in the first region 30 is equal to the distribution density of the light emitting openings 385 in the second region 32. It is to be noted that the distance between adjacent light emitting openings in the above description means the distance between the centers of adjacent light emitting openings. Compared with the previous embodiment, a size of the light emitting opening 384 on the top reflector 382 of the present embodiment are altered as the distance between the light emitting opening 384 and the light source 26 is varied. In the same way, a size of the light emitting opening 385 on the top reflector 382 of the present embodiment are altered as the distance between the light emitting opening 385 and the light source 26 is varied. As shown in FIG. 6, a size of the light emitting opening 384 in the first region 30 is less than a size of the light emitting opening 385 in the second region 32, so that the luminance difference between the first region 30 near the light source 26 and the second region 32 far from the light source 26 can be reduced. In addition, the backlight module 36 can include a diffusion plate 34 disposed on an exiting plane of the backlight module 22, and the top reflector 382 is attached to a surface of the diffusion plate 34 opposite to the bottom reflector 381. Accordingly, the light beams emitted from the light emitting openings 384 and 385 can become a more uniform surface light source through the diffusion plate 34.

Figure 7:
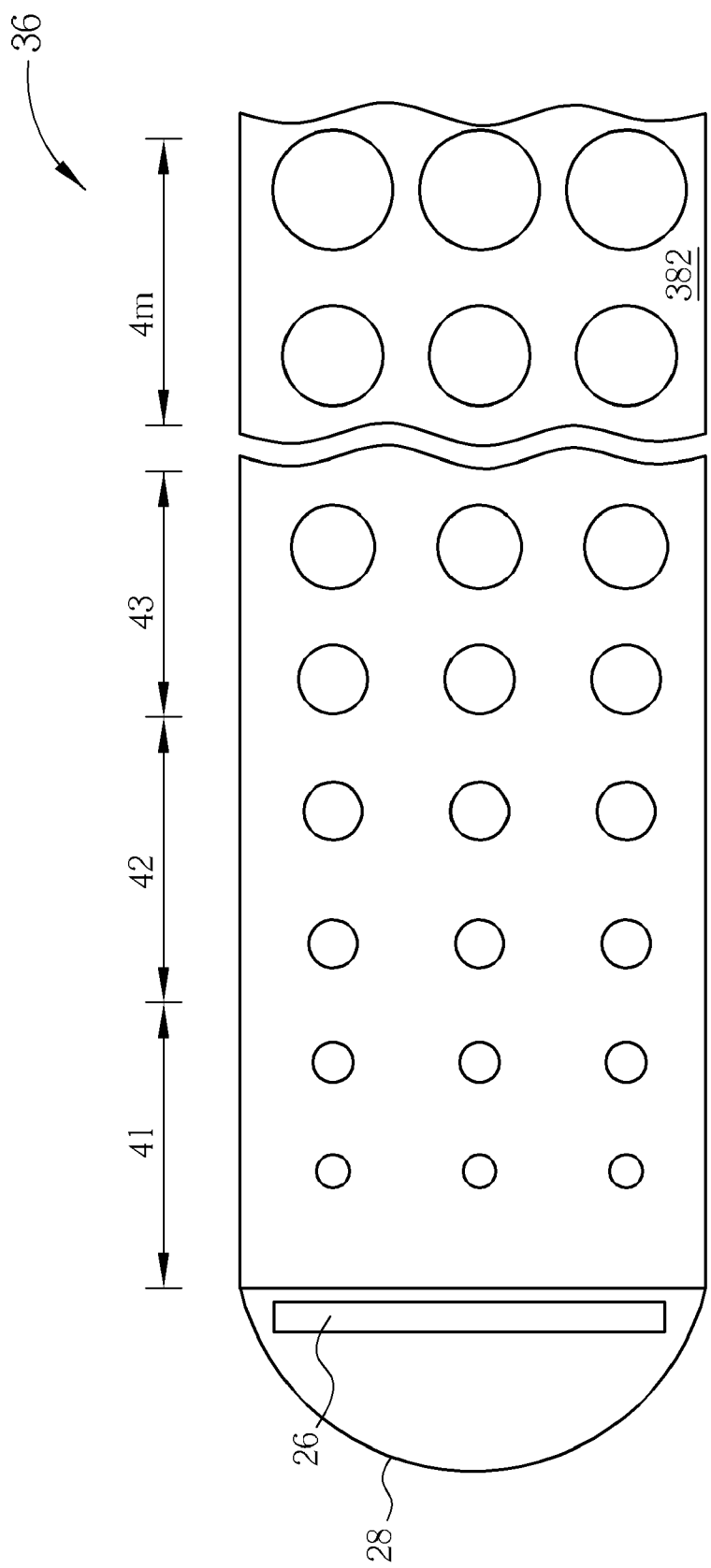
FIG. 7 is a schematic diagram illustrating another example of FIG. 6.

Moreover, the top reflector 382 can be another type in the present embodiment. Refer to FIG. 7, FIG. 7 is a schematic diagram illustrating another example of FIG. 6. As shown in FIG. 7, the top reflector 382 can include m number of regions, such as a 1st region 41, a 2nd region 42, a 3rd region 43, . . .

, (m)th region 4m. A (n−1)th region is adjacent to a (n)th region, where n is a positive integer, and $2 \leq n \leq m$. Also, the distance between the (n−1)th region and the light source 26 is shorter than the distance between the (n)th region and the light source 26, and a size of each of the light emitting openings in the (n−1)th region is less than a size of each of the light emitting openings in the (n)th region. For example, when n is equal to 2, the 1st region 41 is adjacent to the 2nd region 42, and the 1st region 41 is more close to the light source 26 than the 2nd region 42. Also, a size of each of the light emitting openings in the 1st region 41 is less than a size of each of the light emitting openings in the 2nd region 42. Additionally, the number of the light emitting openings per unit area in the (n−1)th region can be equal to the number of the light emitting openings per unit area in the (n)th region. Also, the distance between adjacent light emitting openings in the (n−1)th region can be equal to the distance between adjacent light emitting openings in the (n)th region. It is to be noted that the distance between adjacent light emitting openings in the above description means the distance between the centers of adjacent light emitting openings. Moreover, as the distance between a light emitting opening and the light source increases, the size of the light emitting opening increases gradually, but not limited.

The bottom reflector and the top reflector of the present invention can be specular thin films, opaque thin films, or other layer with a good ability to reflect light beams. Preferably, the bottom reflector and the top reflector can be silver reflection plates or enhanced specular reflectors (ESR), and light emitting openings are formed on the top reflector by techniques such as etching, texturing, and printing. In addition, shapes, numbers, sizes, and the distribution density of the light emitting openings can be modified according to the demand of the product, and it is not limited to the preferred embodiments of the present invention.

In summary, the reflective chamber constructed by the top reflector and the bottom reflector is utilized in the backlight module of the present invention. Accordingly, light beams emitted from the light source can be transmitted by repeated reflection in the reflective chamber, and the light beams can be emitted out of the backlight module through a plurality of light emitting openings on the top reflector. In addition, the number of the light emitting openings per unit area in a region near the light source is less than the number of the light emitting openings per unit area in another region far from the light source, so that the luminance distribution of the backlight module can be more uniform. Additionally, the backlight module of the present invention may not require the light guide plate, and the weight reduction of the backlight module can be achieved.

Those skilled in the art will readily observe that numerous modifications and alterations of the device and method may be made while retaining the teachings of the invention.

What is claimed is:

1. A backlight module, comprising:
   a reflective chamber comprising:
      a bottom reflector;
      a top reflector, disposed opposite to the bottom reflector;
      at least a light entrance; and
      a plurality of light emitting openings, disposed on the top reflector; and
   at least a light source, corresponding to the light entrance;
   wherein the top reflector having m number of regions, a (n−1)th region is adjacent to a (n)th region, a distance between the (n−1)th region and the light source is shorter than a distance between the (n)th region and the light source, a number of the light emitting openings per unit area in the (n−1)th region is less than a number of the light emitting openings per unit area in the (n)th region, where m is a positive integer greater than or equal to 2, n is a positive integer, and $2 \leq n \leq m$.

2. The backlight module of claim 1, wherein a size of each of the light emitting openings is identical.

3. The backlight module of claim 2, wherein a distance between adjacent light emitting openings in the (n−1)th region is greater than a distance between adjacent light emitting openings in the (n)th region.

4. The backlight module of claim 2, wherein as a distance between a light emitting opening and the light source increases, a distance between the light emitting opening and an adjacent light emitting opening decreases gradually.

5. The backlight module of claim 1, wherein the light entrance is disposed on a side of the reflective chamber, and the backlight module is an edge-type backlight module.

6. The backlight module of claim 1, further comprising a diffusion plate, wherein the top reflector is attached to a surface of the diffusion plate opposite to the bottom reflector.

7. The backlight module of claim 1, wherein the light source is a light emitting diode.

8. The backlight module of claim 1, wherein the light source is a cold cathode fluorescent lamp.

9. A backlight module comprising:
   a reflective chamber comprising:
      a bottom reflector;
      a top reflector, disposed opposite to the bottom reflector;
      at least a light entrance; and
      a plurality of light emitting openings, disposed on the top reflector; and
   at least a light source, corresponding to the light entrance;
   wherein the top reflector comprising m number of regions, a (n−1)th region is adjacent to a (n)th region, a distance between the (n−1)th region and the light source is shorter than a distance between the (n)th region and the light source, a size of each of the light emitting openings in the (n−1)th region is less than a size of each of the light emitting openings in the (n)th region, where m is a positive integer greater than or equal to 2, n is a positive integer, and $2 \leq n \leq m$.

10. The backlight module of claim 9, wherein a number of the light emitting openings per unit area in the (n−1)th region is equal to a number of the light emitting openings per unit area in the (n)th region.

11. The backlight module of claim 9, wherein a distance between adjacent light emitting openings in the (n−1)th region is equal to a distance between adjacent light emitting openings in the (n)th region.

12. The backlight module of claim 9, wherein as a distance between a light emitting opening and the light source increases, a size of the light emitting opening increases gradually.

13. The backlight module of claim 9, wherein the backlight module is an edge-type backlight module.

14. The backlight module of claim 9, further comprising a diffusion plate, wherein the top reflector is attached to a surface of the diffusion plate opposite to the bottom reflector.

15. The backlight module of claim 9, wherein the light source is a light emitting diode.

16. The backlight module of claim 9, wherein the light source is a cold cathode fluorescent lamp.

\* \* \* \* \*